United States Patent
Cardona et al.

(10) Patent No.: US 11,415,191 B2
(45) Date of Patent: Aug. 16, 2022

(54) SYSTEM AND METHOD CONFIGURED TO IDENTIFY CONDITIONS INDICATIVE OF ELECTROMAGNETIC BRAKE TEMPERATURE

(71) Applicant: OTIS ELEVATOR COMPANY, Farmington, CT (US)

(72) Inventors: Camilo Cardona, Farmington, CT (US); Steven Michael Millett, Farmington, CT (US); Benjamin J. Watson, Farmington, CT (US); KilMoon Yoon, Changwon (KR); Jeongki Shin, Changwon (KR); Tao Mu, Tianjin (CN)

(73) Assignee: OTIS ELEVATOR COMPANY, Farmington, CT (US)

(*) Notice: Subject to any disclaimer, the term of this patent is extended or adjusted under 35 U.S.C. 154(b) by 188 days.

(21) Appl. No.: 16/592,836

(22) Filed: Oct. 4, 2019

(65) Prior Publication Data
US 2021/0102589 A1    Apr. 8, 2021

(51) Int. Cl.
*F16D 67/06* (2006.01)
*B66B 3/00* (2006.01)
*F16D 55/06* (2006.01)
*F16D 66/00* (2006.01)

(52) U.S. Cl.
CPC ............. *F16D 67/06* (2013.01); *B66B 3/002* (2013.01); *F16D 55/06* (2013.01); *F16D 2066/001* (2013.01); *F16D 2500/5102* (2013.01)

(58) Field of Classification Search
CPC .... F16D 67/06; F16D 55/06; F16D 2066/001; F16D 2500/5102; B66B 3/002
See application file for complete search history.

(56) References Cited

U.S. PATENT DOCUMENTS

| 2004/0124043 A1* | 7/2004 | Lauch | B60T 17/221 |
|---|---|---|---|
|  |  |  | 188/181 T |
| 2011/0303493 A1* | 12/2011 | Hubbard | B66D 5/14 |
|  |  |  | 187/254 |

FOREIGN PATENT DOCUMENTS

| CN | 1038994 A | * | 1/1990 | ............... B66B 1/32 |
|---|---|---|---|---|
| CN | 1486921 A | * | 4/2004 | ........... B66B 5/0006 |
| CN | 101663218 A | * | 3/2010 | ............... B66B 5/02 |
| CN | 101268003 B | * | 8/2010 | ............... B66B 1/32 |
| CN | 101910041 A | * | 12/2010 | ............... B66B 1/32 |
| CN | 107814288 A | * | 3/2018 | |
| DE | 3708261 A1 | * | 9/1987 | |
| EP | 2672622 A1 | * | 12/2013 | ............... B60L 7/14 |
| JP | 03083794 A | * | 4/1991 | |
| JP | 03106793 A | * | 5/1991 | |

* cited by examiner

*Primary Examiner* — Melanie Torres Williams
(74) *Attorney, Agent, or Firm* — Carlson, Gaskey & Olds, P.C.

(57) ABSTRACT

This disclosure relates to a system and method configured to identify and, if necessary, respond to conditions indicative of electromagnetic brake temperature, and in particular relates to passenger conveyers, such as elevators, employing the system and method. More specifically, an example passenger conveyer system includes an electromagnetic brake and a controller configured to identify a condition indicative of a temperature of the electromagnetic brake approaching a boundary of a predetermined operating range.

19 Claims, 3 Drawing Sheets

SYSTEM AND METHOD CONFIGURED TO IDENTIFY CONDITIONS INDICATIVE OF ELECTROMAGNETIC BRAKE TEMPERATURE

TECHNICAL FIELD

This disclosure relates to a system and method configured to identify conditions indicative of an electromagnetic brake temperature, and in particular relates to passenger conveyer systems, such as elevator systems, employing the system and method.

BACKGROUND

Passenger conveyer systems such as elevator systems generally include a motor, drive shaft, and brake system. In the context of an elevator system, the motor, drive shaft, and brake system control movement of an elevator car within a hoistway. One known type of brake system includes an electromagnetically released brake configured to permit rotation of the drive shaft when an electromagnet is activated and to prevent rotation of the drive shaft, and in turn vertical motion of the elevator car, when the electromagnet is deactivated.

SUMMARY

A passenger conveyer system according to an exemplary aspect of the present disclosure includes, among other things, an electromagnetic brake and a controller configured to identify a condition indicative of a temperature of the electromagnetic brake approaching a boundary of a predetermined operating range.

In a further non-limiting embodiment of the foregoing passenger conveyer system, the controller is configured to take corrective action when the condition is identified.

In a further non-limiting embodiment of any of the foregoing passenger conveyer systems, the controller is configured to at least temporarily stop operation of the passenger conveyer system when the condition is identified.

In a further non-limiting embodiment of any of the foregoing passenger conveyer systems, the controller identifies the condition without directly determining a temperature of the electromagnetic brake.

In a further non-limiting embodiment of any of the foregoing passenger conveyer systems, the system includes a motor mechanically connected to the electromagnetic brake and a torque sensor configured to provide an output indicative of a torque of the motor. Further, the controller is configured to identify the condition when the output of the torque sensor exceeds a predetermined torque threshold.

In a further non-limiting embodiment of any of the foregoing passenger conveyer systems, the controller is configured to identify the condition when a duty cycle of the passenger conveyer system exceeds a predetermined duty threshold.

In a further non-limiting embodiment of any of the foregoing passenger conveyer systems, the controller determines the duty cycle by monitoring a status of a switch configured to open and close to selectively permit current to flow through an electromagnet of the electromagnetic brake.

In a further non-limiting embodiment of any of the foregoing passenger conveyer systems, the switch is between a power supply and the electromagnet.

In a further non-limiting embodiment of any of the foregoing passenger conveyer systems, the switch is in electronic communication with the controller.

In a further non-limiting embodiment of any of the foregoing passenger conveyer systems, the controller is configured to identify the condition based on a difference between a time current is directed to the electromagnetic brake and a time the electromagnetic brake is disengaged from a drive shaft.

In a further non-limiting embodiment of any of the foregoing passenger conveyer systems, the system includes a first switch between a power supply and the electromagnetic brake. The first switch is configured to selectively open and close in response to instructions from the controller. The system further includes a second switch configured to provide an output indicative of whether the electromagnetic brake is engaged or disengaged.

In a further non-limiting embodiment of any of the foregoing passenger conveyer systems, the controller is configured to determine the time current is directed to the electromagnetic brake based on a time the first switch closes, and the controller is configured to determine the time the electromagnetic brake is disengaged from the drive shaft based on the output of the second switch.

In a further non-limiting embodiment of any of the foregoing passenger conveyer systems, the condition is indicative of the temperature of the electromagnetic brake approaching one of an upper threshold and a lower threshold.

In a further non-limiting embodiment of any of the foregoing passenger conveyer systems, the controller is configured to identify a plurality of conditions in parallel, and each of the plurality of conditions is indicative of the temperature of the electromagnetic brake approaching the boundary of the predetermined operating range.

In a further non-limiting embodiment of any of the foregoing passenger conveyer systems, the passenger conveyer system is an elevator system.

A method according to an exemplary aspect of the present disclosure includes, among other things, identifying a condition indicative of a temperature of an electromagnetic brake of a passenger conveyer system approaching a boundary of a predetermined operating range.

In a further non-limiting embodiment of the foregoing method, the identifying step is based on whether a torque of a motor mechanically connected to the electromagnetic brake exceeds a predetermined torque threshold.

In a further non-limiting embodiment of the foregoing method, the identifying step is based on whether a duty cycle of the passenger conveyer system exceeds a predetermined duty threshold.

In a further non-limiting embodiment of the foregoing method, the identifying step is based on whether a time difference between a time current is directed to the electromagnetic brake and a time the electromagnetic brake is disengaged from a drive shaft exceeds a predetermined threshold.

In a further non-limiting embodiment of the foregoing method, the passenger conveyer system is an elevator system.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

This disclosure relates to a system and method configured to identify and, if necessary, respond to conditions indicative of electromagnetic brake temperature, and in particular relates to passenger conveyers, such as elevators, employing the system and method. An example passenger conveyer system includes an electromagnetic brake and a controller configured to identify a condition indicative of a temperature of the electromagnetic brake approaching a boundary of a predetermined operating range. Among other benefits, which will be appreciated from the below description, this disclosure limits operation of the passenger conveyer system to ensure the electromagnetic brake is operating within an optimal temperature range for efficient operation. In this disclosure, a temperature of the electromagnetic brake is not directly determined (e.g., calculated or derived from a lookup table), but rather the system responds to conditions indicative of the temperature of the electromagnetic brake without needing to first quantify the temperature. Further, this disclosure makes use of existing hardware of the passenger conveyer system, which reduces cost.

Figure 1:
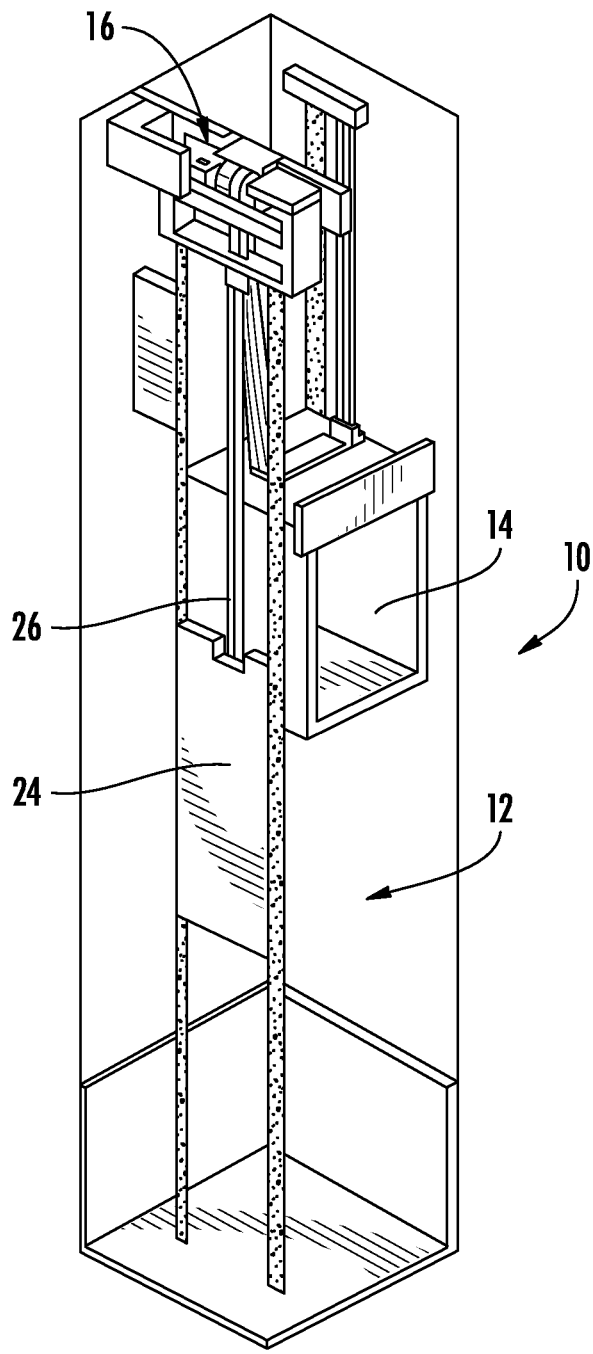
FIG. 1 illustrates an example passenger conveyer system.

FIG. 1 illustrates an example passenger conveyer system 10. In FIG. 1, the passenger conveyer system 10 is an elevator system, however this disclosure extends to other passenger conveyer systems such as escalators.

Figure 2:
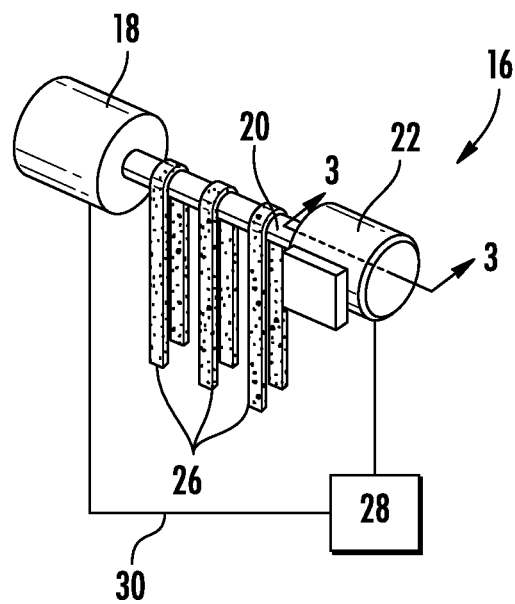
FIG. 2 illustrates an example drive system.

The passenger conveyer system 10 includes a hoistway 12 within which an elevator car 14 travels. Travel of the elevator car 14 is governed, in this example, by a drive system 16 including an electric motor 18 (FIG. 2), a drive shaft 20 mechanically connected to the electric motor 18, and an electromagnetically released brake 22 mechanically connected to the electric motor 18 via the drive shaft 20. The electromagnetically released brake 22 will be referred to herein as an electromagnetic brake. In this example, the drive system 16 is mounted near the top of the hoistway 12. It should be understood, however, that the drive system 16 need not be mounted within the hoistway 12 and could be arranged outside the hoistway 12 in a machine room, for example.

The elevator car 14 and a counterweight 24 are suspended from one or more suspension members 26, such as belts or ropes, wrapped around the drive shaft 20. Thus, when the drive shaft 20 rotates, the elevator car 14 moves vertically up or down within the hoistway 12 depending upon the direction of rotation of the drive shaft 20.

A controller 28 monitors and controls drive system 16. The controller 28 is shown schematically in FIG. 2. The controller 28 includes electronics, software, or both, to perform the necessary control functions for operating the drive system 16. In one non-limiting embodiment, the controller 28 is an elevator drive controller. Although it is shown as a single device, the controller 28 may include multiple controllers in the form of multiple hardware devices, or multiple software controllers within one or more hardware devices. A controller area network (CAN) 30, illustrated schematically, allows the controller 28 to communicate with various components of the passenger conveyer system 10 by wired and/or wireless electronic connections.

Figure 3:
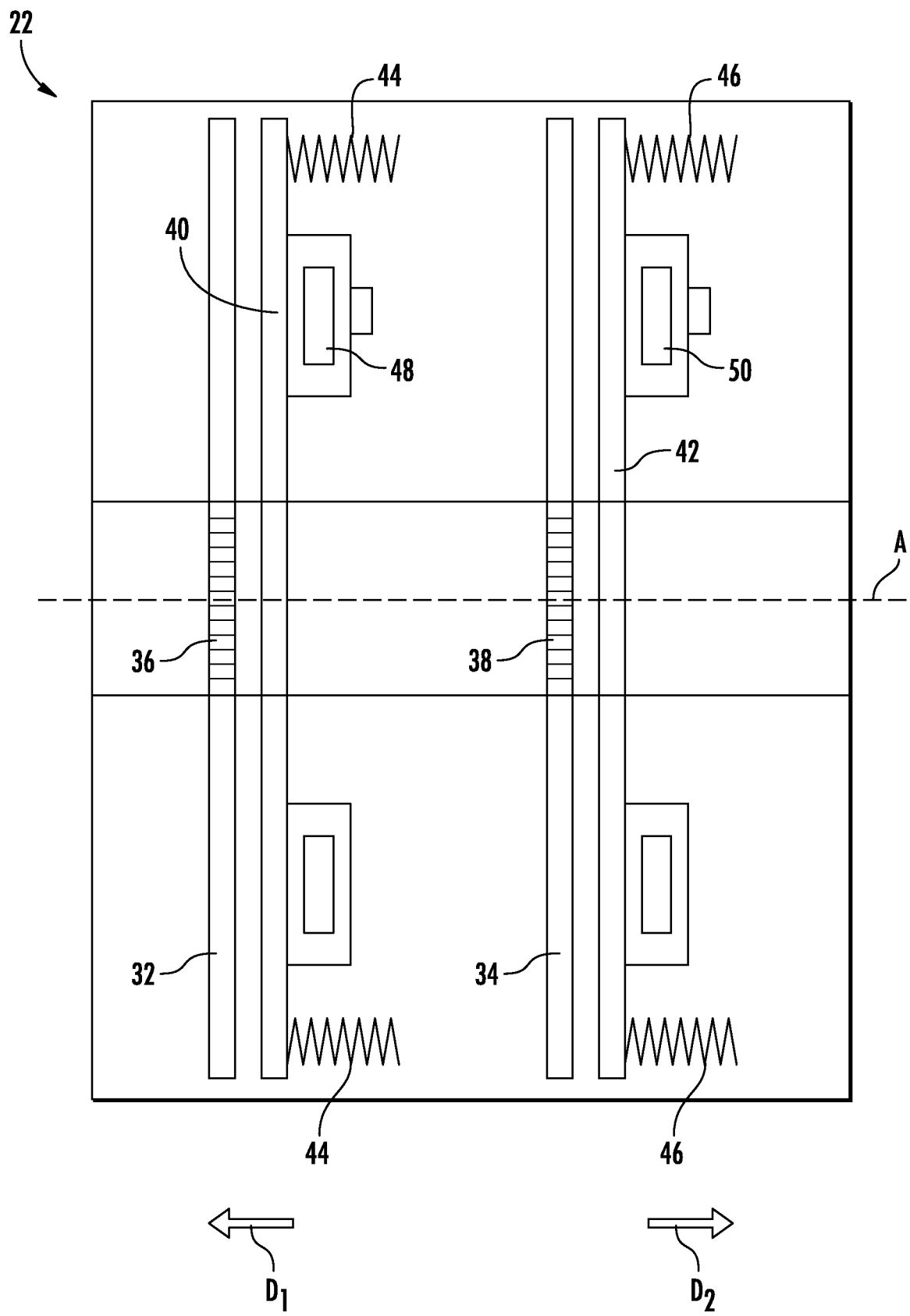
FIG. 3 is a schematic, cross-sectional view taken along line 3-3 from FIG. 2, and illustrates detail of an example electromagnetic brake.

FIG. 3 is a cross-sectional view showing additional detail of an example electromagnetic brake 22. In this example, the electromagnetic brake 22 is a clutch brake, but this disclosure is not limited to clutch brakes and extends to other types of electromagnetic brakes such as caliper brakes, drum brakes, etc.

In the example of FIG. 3, the electromagnetic brake 22 is oriented about a central axis A and includes first and second discs 32, 34 including splines 36, 38 configured to interface with the drive shaft 20 (not shown in FIG. 3). The discs 32, 34, and in turn the drive shaft 20, are configured to selectively rotate about the central axis A depending on a position of respective first and second plates 40, 42. In this example, the first and second plates 40, 42 are biased in a first direction $D_1$ by respective sets of first springs 44 and second springs 46 into engagement, specifically direct contact, with the first and second discs 32, 34. The first direction $D_1$ is parallel to the central axis A and extends in the left-hand direction relative to FIG. 3. When the first and second plates 40, 42 directly contact the respective first and second discs 32, 34 under the force of the first and second springs 44, 46, the first and second plates 40, 42 prevent the first and second discs 32, 34 from rotating about the central axis A. In this condition, the electromagnetic brake 22 is engaged and the drive shaft 20 is prevented from rotating, and, thus, the elevator car 14 is prevented from moving within the hoistway 12.

In order to disengage the electromagnetic brake 22 and permit rotation of the drive shaft 20, the controller 28 issues one or more instructions to activate one or more electromagnets of the electromagnetic brake 22. In this disclosure, the electromagnetic brake 22 includes two electromagnets, each including a respective coil 48, 50 of wire. The coils 48, 50 may extend circumferentially about the central axis A. In response to instructions from the controller 28, current flows through the coils 48, 50, to produce magnetic fields sufficient to attract the first and second plates 40, 42, which themselves may be made of a material that is attracted to the magnetic fields, such as metal. The magnetic fields produced by the coils 48, 50 overcome the force of the first and second springs 44, 46 and causes the first and second plates 40, 42 to move in a second direction $D_2$ opposite the first direction $D_1$ such that the first and second plates 40, 42 no longer directly contact the first and second discs 32, 34. As such, the first and second discs 32, 34 are free to rotate about the central axis A. The drive shaft 20 is, in turn, also free to rotate.

While FIG. 3 illustrates one example electromagnetic brake 22, this disclosure is not limited to the details of FIG. 3. In particular, while the electromagnetic brake 22 includes two sets of discs, plates, coils, springs, etc., this disclosure extends to electromagnetic brakes with one or more sets of discs, plates, coils, and springs.

In this disclosure, to ensure efficient operation of the drive system 16, the controller 28 is configured to identify one or more conditions indicative of a temperature of the electromagnetic brake 22 approaching a boundary, namely an upper or lower limit, of a predetermined operating range. The term approaching as used herein means that the temperature of the electromagnetic brake 22 is within a predetermined amount of an upper or lower limit. To this end, while approaching a boundary is referenced herein, this disclosure is inclusive of conditions indicative of the temperature of the electromagnetic brake 22 falling outside the predetermined operating range. The predetermined operating range may be based on a range within which the electromagnetic brake 22 operates efficiently. The predetermined operating range may be set by a manufacturer and/or based on temperature ratings for various components of the electromagnetic brake 22. In this disclosure, the term "identify" is used to mean that the controller 28 is configured to receive signals from various components of the passenger conveyer system 10 and recognize when they meet certain criteria.

Figure 4:
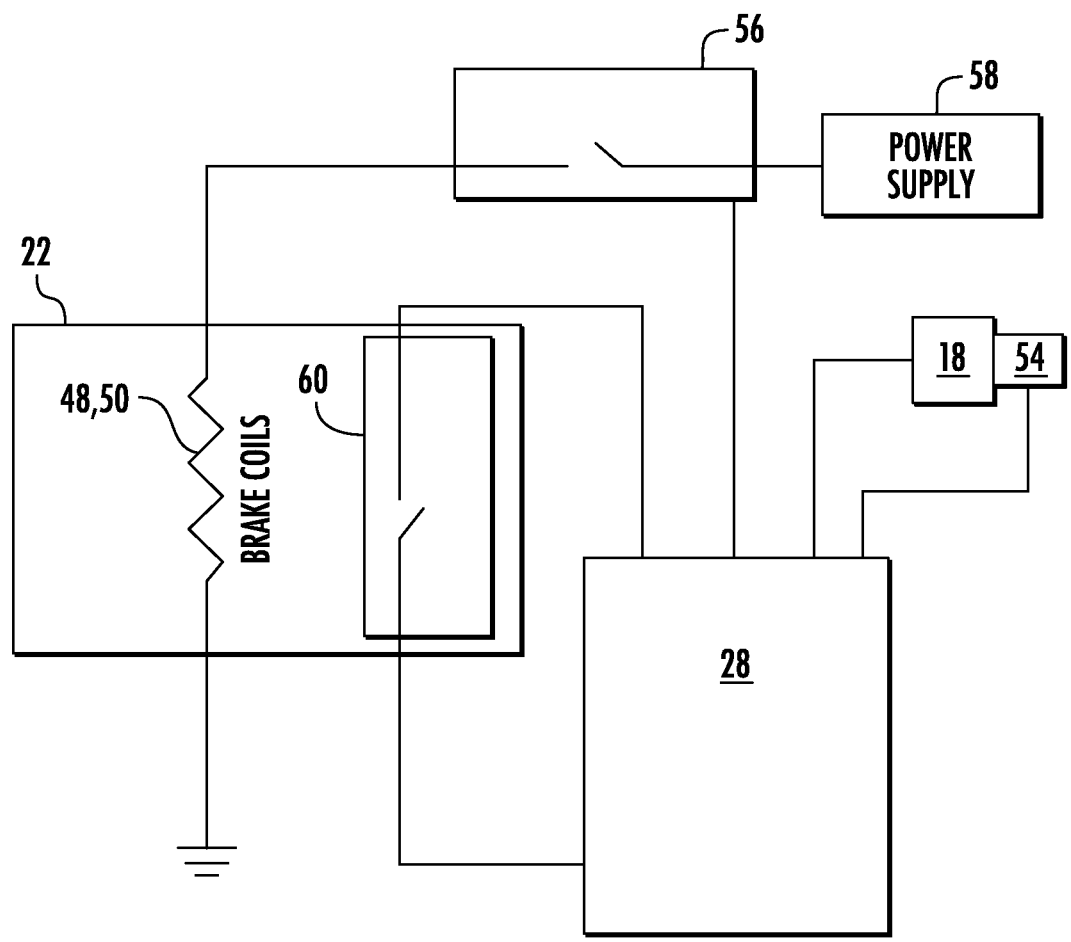
FIG. 4 schematically illustrates various components of the example passenger conveyer system.

FIG. 4 schematically illustrates the controller 28 relative to various components of the passenger conveyer system 10. The controller 28 is configured to identify a condition indicative of a temperature of the electromagnetic brake 22 approaching a boundary of a predetermined operating range based on inputs from one or more of these components, as will now be described. While the controller 28 is configured to identify conditions indicative of temperature of the electromagnetic brake 22, the controller 28 does so in this disclosure without directly determining (i.e., calculating) a temperature of the electromagnetic brake 22. For instance, there are no temperature sensors mounted to the electromagnetic brake 22, and the controller 28 is not in electronic communication with any such temperature sensors.

With reference to FIG. 4, the controller 28 is configured to identify a condition where the electromagnetic brake 22 is approaching a boundary of the predetermined operating range when the output of a torque sensor 54 exceeds a predetermined torque threshold. The torque sensor 54 is configured to provide an output indicative of a torque of the electric motor 18, and the predetermined torque threshold is a predetermined value that is stored in the controller 28, in one example. In one example, the torque sensor 54 is provided by the motor 18 and/or the controller 28. In that example, torque can be determined by monitoring motor current feedback. In another example, the torque sensor 54 is a separate, dedicated sensor. When the output of the torque sensor 54 indicates that the predetermined torque threshold has been exceeded, this may indicate the electromagnetic brake 22 is applying excess friction while the electric motor 18 is running, for example. As such, in this disclosure, the controller 28 may take a corrective action, such as at least temporarily stopping operation of the passenger conveyer system 10 or heating or cooling the electromagnetic brake 22.

In another aspect of this disclosure, the controller 28 is configured to identify a condition where the electromagnetic brake 22 is approaching a boundary of the predetermined operating range when a duty cycle of the passenger conveyer system 10 exceeds a predetermined duty cycle threshold. In particular, the controller 28 is configured to monitor how often the passenger conveyer system 10 is active during a particular period of time. When the passenger conveyer system 10 is active, the elevator car 14 is moving and the electromagnetic brake 22 is disengaged. As such, current is flowing though the coils 48, 50. The duty cycle may be determined based on a status of a first switch 56, and in particular by ascertaining the total amount of time a first switch 56 is closed during a time period. The first switch 56, which may be a relay, is configured to selectively open and close in response to instructions from the controller 28. When the first switch 56 is closed, a power supply 58, such as a fixed voltage power supply like a battery, is electronically connected to the coils 48, 50. The power supply 58 may be 24 or 48 Volts, as examples.

In yet another aspect of this disclosure, the controller 28 is configured to identify a condition where the electromagnetic brake 22 is approaching the boundary of the predetermined operating range based on a difference between a time current is directed to the electromagnetic brake 22 and a time the electromagnetic brake 22 is disengaged from a drive shaft 20. This time difference may be referred to as "pick time" or "brake pick time." The controller 28 is configured to take corrective action if the pick time exceeds a predetermined threshold. Excess pick time may be indicative of a short in one or both of the coils 48, 50 leading to a lower strength magnetic field.

In order to determine pick time, the controller 28 monitors outputs of the first switch 56 and a second switch 60, which may also be a relay. In a particular example, the second switch 60 is configured to close when the first and second plates 40, 42 have come out of direct contact with the discs 32, 34. In other words, the second switch 60 is configured to close when the electromagnetic brake 22 is disengaged and open when the electromagnetic brake 22 is engaged. Thus, in this example, the controller 28 determines pick time by determining the time between closure of the first switch 56 and closure of the second switch 60. It should be understood that the second switch 60 could be a plurality of switches connected in series, with each switch corresponding to a respective one of the plates 40, 42.

In another aspect of the disclosure, the time between a current interruption as indicated by opening the first switch 56 and a time the electromagnetic brake 22 engages as indicated by opening of switch 60 is monitored. This time may be referred to as "drop time." A drop time above a predetermined threshold may indicate that a temperature of the electromagnetic brake 22 is below a lower threshold.

While a number of aspects of this disclosure have been described above, it should be understood that this disclosure extends to passenger conveyer systems including one or all of the disclosed embodiments. For instance, the controller 28 could monitor for a number of conditions indicative of the electromagnetic brake 22 approaching a boundary of the predetermined operating range in parallel. The controller 28 could take corrective action if any one of the monitored conditions indicates the electromagnetic brake 22 is approaching the boundary. In this sense, each of the conditions is separately indicative of the temperature of the electromagnetic brake approaching the boundary of the predetermined operating range.

It should be understood that terms such as "generally," "substantially," and "about" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A passenger conveyer system, comprising:
   an electromagnetic brake; and a controller configured to identify a condition indicative of a temperature of the electromagnetic brake approaching a boundary of a predetermined operating range, wherein the predetermined operating range is set such that, within the predetermined operating range, the electromagnetic brake operates at a temperature corresponding to efficient operation of the electromagnetic brake, wherein the predetermined operating range is based on one or both of (i) a manufacturer setting and (ii) a temperature rating for one or more components of the electromagnetic brake, and wherein the controller is configured to identify the condition when an input from a component of the passenger conveyer system meets one or more predetermined criterion and without first quantifying the temperature of the electromagnetic brake, wherein the predetermined operating range is based on a temperature rating of a first one of the components of the electromagnetic brake, and wherein the temperature rating is a predefined maximum operating temperature of the first component.

2. The passenger conveyer system as recited in claim 1, wherein the controller is configured to take corrective action when the condition is identified.

3. The passenger conveyer system as recited in claim 2, wherein the controller is configured to at least temporarily stop operation of the passenger conveyer system when the condition is identified.

4. The passenger conveyer system as recited in claim 1, wherein the controller identifies the condition without directly determining a temperature of the electromagnetic brake.

5. The passenger conveyer system as recited in claim 1, further comprising:
a motor mechanically connected to the electromagnetic brake;
a torque sensor configured to provide an output indicative of a torque of the motor; and
wherein the controller is configured to identify the condition when the output of the torque sensor exceeds a predetermined torque threshold.

6. The passenger conveyer system as recited in claim 1, wherein the controller is configured to identify the condition when a duty cycle of the passenger conveyer system exceeds a predetermined duty threshold.

7. The passenger conveyer system as recited in claim 6, wherein the controller determines the duty cycle by monitoring a status of a switch configured to open and close to selectively permit current to flow through an electromagnet of the electromagnetic brake.

8. The passenger conveyer system as recited in claim 7, wherein the switch is between a power supply and the electromagnet.

9. The passenger conveyer system as recited in claim 7, wherein the switch is in electronic communication with the controller.

10. The passenger conveyer system as recited in claim 1, wherein the controller is configured to identify the condition based on a difference between a time current is directed to the electromagnetic brake and a time the electromagnetic brake is disengaged from a drive shaft.

11. The passenger conveyer system as recited in claim 10, further comprising:
a first switch between a power supply and the electromagnetic brake, wherein the first switch is configured to selectively open and close in response to instructions from the controller; and
a second switch configured to provide an output indicative of whether the electromagnetic brake is engaged or disengaged.

12. The passenger conveyer as recited in claim 11, wherein:
the controller is configured to determine the time current is directed to the electromagnetic brake based on a time the first switch closes, and
the controller is configured to determine the time the electromagnetic brake is disengaged from the drive shaft based on the output of the second switch.

13. The passenger conveyer system as recited in claim 1, wherein the condition is indicative of the temperature of the electromagnetic brake approaching one of an upper threshold and a lower threshold.

14. The passenger conveyer system as recited in claim 1, wherein:
the controller is configured to identify a plurality of conditions in parallel,
each of the plurality of conditions is indicative of the temperature of the electromagnetic brake approaching the boundary of the predetermined operating range, and
the plurality of conditions include a torque of a motor, a duty cycle, a pick time, and a drop time.

15. The passenger conveyer system as recited in claim 1, wherein the passenger conveyer system is an elevator system.

16. A method, comprising:
identifying a condition indicative of a temperature of an electromagnetic brake of a passenger conveyer system approaching a boundary of a predetermined operating range, wherein the predetermined operating range is set such that, within the predetermined operating range, the electromagnetic brake operates at a temperature corresponding to efficient operation of the electromagnetic brake, wherein the predetermined operating range is based on one or both of (i) a manufacturer setting and (ii) a temperature rating for one or more components of the electromagnetic brake, and wherein the condition is identified when an input from a component of the passenger conveyer system meets one or more predetermined criterion and without first quantifying the temperature of the electromagnetic brake, wherein the identifying step is based on whether a duty cycle of the passenger conveyer system exceeds a predetermined duty threshold.

17. The method as recited in claim 16, wherein the identifying step is also based on whether a torque of a motor mechanically connected to the electromagnetic brake exceeds a predetermined torque threshold.

18. The method as recited in claim 16, wherein the passenger conveyer system is an elevator system.

19. A method, comprising:
identifying a condition indicative of a temperature of an electromagnetic brake of a passenger conveyer system approaching a boundary of a predetermined operating range, wherein the predetermined operating range is set such that, within the predetermined operating range, the electromagnetic brake operates at a temperature corresponding to efficient operation of the electromagnetic brake, wherein the predetermined operating range is based on one or both of (i) a manufacturer setting and (ii) a temperature rating for one or more components of the electromagnetic brake, and wherein the condition is identified when an input from a component of the passenger conveyer system meets one or more predetermined criterion and without first quantifying the temperature of the electromagnetic brake, wherein the identifying step is based on whether a time difference between a time current is directed to the electromagnetic brake and a time the electromagnetic brake is disengaged from a drive shaft exceeds a predetermined threshold.

* * * * *